United States Patent [19]

Ezis

[11] Patent Number: 5,302,328
[45] Date of Patent: * Apr. 12, 1994

[54] MAKING HOT PRESSED SILICON NITRIDE BY USE OF LOW DENSITY REACTION BONDED BODY

[75] Inventor: Andre Ezis, Grosse Ile, Mich.
[73] Assignee: Ceradyne, Inc., Costa Mesa, Calif.
[*] Notice: The portion of the term of this patent subsequent to Jun. 12, 2009 has been disclaimed.
[21] Appl. No.: 527,642
[22] Filed: Jul. 19, 1983
[51] Int. Cl.$^5$ .................... B28B 11/00; C04B 35/58
[52] U.S. Cl. ........................ 264/58; 264/325; 264/332
[58] Field of Search ............. 264/332, 325, 68, 69, 264/58

[56] References Cited

U.S. PATENT DOCUMENTS

| | | | |
|---|---|---|---|
| 3,467,745 | 9/1969 | Lambertson | 264/332 |
| 3,535,132 | 10/1970 | Lunde | 264/332 |
| 3,589,880 | 6/1971 | Clark | 264/332 |
| 3,632,708 | 1/1972 | Mandorf | 264/332 |
| 3,835,210 | 9/1974 | Kirkpatrick | 264/332 |
| 3,989,438 | 11/1976 | Smith | 264/332 |

FOREIGN PATENT DOCUMENTS 1405171 9/1975 United Kingdom ............ 264/58

*Primary Examiner*—James Derrington
*Attorney, Agent, or Firm*—Leonard Tachner

[57] ABSTRACT

A method is disclosed of fully densifying a plurality of preformed ceramic plates by axial compression of the billets along a wall defining a cylinder and cavity. A series of the plates are stacked along the wall with the smallest dimension of the billets aligned with the axis of the cavity. The billets have a ratio of the smallest dimension to the largest dimension in the range of 1:3 to 1:40. The largest dimension of each of the plates is less than the lateral dimension of the cavity to leave an annular space; the space is filled with a pseudo isostatic pressing medium. The assembly is hot pressed under sufficient pressure and heat to convert the plates to billets of substantially full density.

8 Claims, 3 Drawing Sheets

MAKING HOT PRESSED SILICON NITRIDE BY USE OF LOW DENSITY REACTION BONDED BODY

TECHNICAL FIELD

This invention relates to the technology of hot pressing ceramics, particularly silicon nitride.

BACKGROUND OF THE INVENTION AND PRIOR ART STATEMENT

This invention is directed to an improvement in the art of making hot pressed silicon nitride from silicon or silicon nitride powder as a starting material. When starting with silicon powder, such powder is first subjected to a reactive nitriding gas to form a mixed phase polycrystalline silicon nitride rigid body, the body being then hot pressed. Within this art there are several ways to agglomerate the powder materials: (a) by cold compacting or forming into a powder preform as an early stage in the process before or without nitriding (see U.S. Pat. No. 3,839,540), (b) nitriding without compaction (see U.S. patent application Ser. No. 448,889, commonly assigned to the assignee herein), and (c) by hot pressing, without prior compaction or nitriding, as the last stage in the process with $Si_3N_4$.

The preform or resulting cake, using any of the above agglomeration techniques, presents a severe height to width ratio requiring an unusually long hot pressing stroke to obtain full densification of the material. For example, the cake or preform can have a density of 0.9-2.5 gm/cm$^3$ and must be converted to a density of 3.25 gm/cm$^3$ or above. A long pressing stroke, particularly under the high temperature and pressing conditions associated with hot pressing, induces significant side wall drag, a friction impediment at the interface between the sides of the cake or billet and the interior wall of the pressing cavity. The side wall drag, in conjunction with the thermal and pressure gradients within the material, produces "material transport," leading to a dishing effect of the resulting pressed product which can be quite pronounced.

What is needed is a method by which relatively low density cakes or preforms can be hot pressed without the above recited disadvantages.

SUMMARY OF THE INVENTION

The invention is a method of fully densifying a plurality of preformed ceramic plates by axial compression of the plates along a wall defining a cylindrical cavity. First, the series of preformed ceramic plates are stacked along the wall with the smallest dimension of the plates being aligned with the axis of the cavity, each plate having a ratio of the smallest dimension to largest dimension in the range of 1:3 to 1:40 and having the largest dimension less than the lateral dimension of the cavity, to leave an annular space between the plates and wall.

Then, either before or after introduction of the plates into the cavity, a pseudo isostatic pressing medium is placed about the plates to fill the space when stacked in the cavity. The stacked series of plates are hot pressed with said pressing medium filling said space, the hot pressing being carried out with sufficient temperature and pressure to convert said plates into billets with substantially full density.

Preforming of the plates can be accomplished in a number of ways, including the following: (1) compacting a mixture of $Si_3N_4$ and densification additives under pressure, (2) preheating a mixture of $Si_3N_4$ and densification additives in a forming crucible without pressure, (3) compacting a mixture of silicon metal powder and densification additives and then nitriding the mixture in a suitable forming dish, and (4) nitriding an uncompacted mixture of silicon metal powder and densification additives in a suitable forming dish.

Preferably, the pseudo isostatic pressing medium is selected from the group comprising boron nitride powder, flake graphite, a powder mixture of silicon nitride and boron nitride, ground borosilicate glass, and graphite foil. The annular space is preferably $\frac{1}{8}$-1/64 inch taken along a radius of the cavity. The pseudo isostatic pressing medium can be placed about the billets by one of the following modes: casting, vibration, slurry coating, or implantation.

The plates preferably have a density in the overall range of 0.8-2.4 gm/cm$^3$. Advantageously, the preformed plates are prepared by cold compacting a powder mixture of silicon nitride and pressing aids, each preform having a density, prior to hot pressing, of 1.6-1.8 gm/cm$^3$. The preformed plates are stacked in groups of about five, each group separated from the other by a rigid, inert spacer (such as graphite) which has a lateral dimension snuggly fitting across the cylindrical cavity; the space is preferably filled with boron nitride powder.

Alternatively, the billets are prepared by cold pressing Si metal and nitriding, preferably having a density of 2.0-2.3 gm/cc. The plates are separated by a parting agent such as BN or grafoil sheet and placed one on top of the other to a height that upon hot compression will occupy available effective hot pressing zone. No rigid spacers such as graphite are used.

Alternatively, the billets are advantageously prepared by heating an uncompacted quantity of silicon and fluxing agents in a nitriding atmosphere to fully react the mixture and form a reaction bonded cake; the cakes each have a density of 1.1-1.8 gm/cm$^3$. The reaction bonded cakes are wrapped with several plys of graphite foil which are effective to fill said space.

BEST MODE FOR CARRYING OUT THE INVENTION

Figure 1:
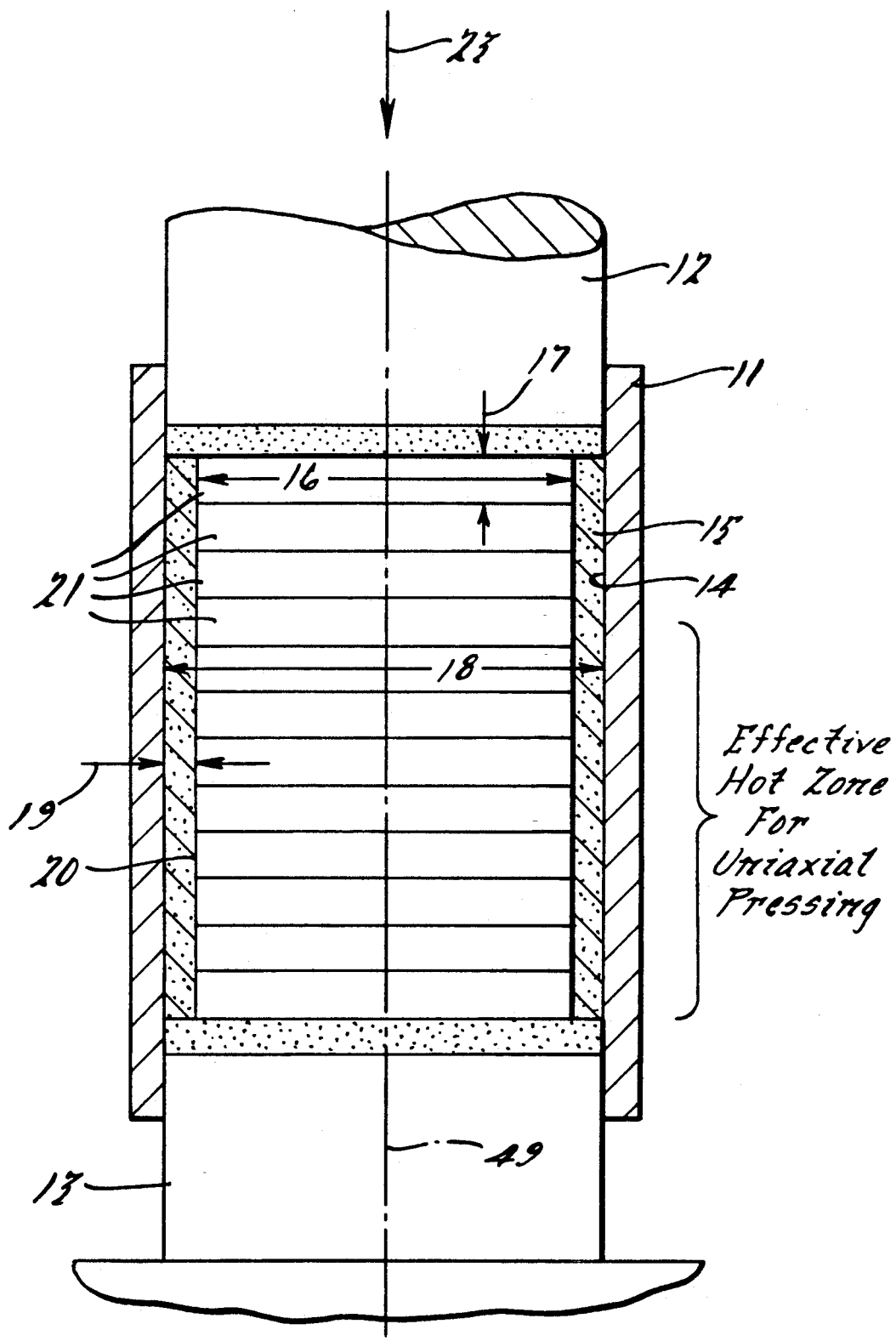
FIG. 1 is a schematic cross sectional view of a hot pressing apparatus with a stacked series of preformed plates ready for hot pressing in accordance with the principles of this invention.

A preferred method for carrying out the invention is as follows.

1. Making a Preform

(a) Mixing

A mixture of powder silicon, $SiO_2$ as an oxide film on the silicon powder, and at least one reactive oxygen carrying agent is prepared. The reactive oxygen carrying agent is defined herein to mean a powder ingredient that is effective to form second phase crystallites, particularly oxynitrides and/or appropriate silicates, when reacted with the silicon under a heated nitrogen atmosphere or which develop during the hot pressing operation itself. The oxygen carrying agents can function as a densification aid and can be advantageously selected from the group consisting of $Y_2O_3$, mgO, $CeO_2$, $ZrO_2$, $HfO_2$, as well as other rare earths.

For purposes of the preferred method, a uniform powder mixture is prepared with 2000 grams of silicon (86.6 weight percent of the mixture), 278 grams of $Y_2O_3$ (12 weight percent of the mixture and 13.9 weight percent of the silicon), and 32 grams of $Al_2O_3$ (1.4 weight percent of the mixture and 1.6 weight percent of the silicon). The usable range for the oxygen carrying agents is 0.4–2.3 molar percent of the mixture, and 0.42–2.4 molar percent of the silicon.

The normal permitted impurities and particle size is detailed further in copending U.S. application Ser. No. 444,251, commonly assigned to the assignee herein, the disclosure of which is incorporated herein by reference.

(b) Milling

The mixture is comminuted and blended by being charged into an inert milling jar along with grinding media in the form of Burundum cylinders (85% $Al_2O_3$, 11% $SiO_2$, 2% MgO, 1.2% CaO, 0.8% of the combination of $TiO_2$, $Fe_2O_3$, $Na_2O$ and $K_2O$). The mixture is milled for a period of about 48 hours at 64 rpm and then separated from the media by use of a #10 mesh screen; this milling is carried out dry. The resulting milled mixture will have at least 50% by weight thereof with an average particle size of about 4 microns and 90% by weight having a particle size of less than 23 microns.

(c) Loading Powder Supply Into Furnace

The milled mixture is then poured onto a generally flat refractory dish or plate to be used as a carrier into the furnace. The dish may have a rim of sufficient height only to prevent the -material from spilling over the edge of the plate. However, the diameter or lateral dimension of the plate should be sized so that it forms a preformed plate or cake (see FIG. 1) having a diameter (16) which is less than the diameter (18) of the cylindrical cavity (14) to be later used for hot pressing. This difference is to allow for an annular space (15) about the preforms (21) which is filled by an isostatic pressing medium. The ratio of the smallest dimension (17) to the largest dimension (16) of each billet (21) to be formed should be in the range of 1:3 to 1:40.

The powder mixture is distributed generally uniformly across the dish to have a thickness in the range of 1-2 inches. Other forms of carriers may be employed to transfer the powder in a desired configuration to the heating furnace. For example, refractory type furnace furniture in the form of cylinders or cubicles may be employed, or other polygons having a general cross-sectional configuration similar to that which is desired in the final product and similar to the cross-section of the hot pressing cylinder. The furnace furniture is designed so that the powder may be poured thereinto, contained and supported, but not compacted. The density of the loose, uncompacted powder on such carrier or furnace furniture can be in the range of 0.4–1.2 gm/cm$^3$, preferably less than 1.0 gm/cm$^3$. The density will be a function of the particle size and particle size distribution of the silicon powder. Thus, for example, with a silicon powder supply having a maximum particle size no greater than 10 microns, the density will be about 0.75 gm/cm$^3$. With a maximum particle size criteria of 4 microns, the loose density will be about 0.50 gm/cm$^3$.

(d) Heating to Nitride

The loose mixture is then heated in a suitable nitriding atmosphere to produce a silicon nitride comprising preform. The furnace is preferably evacuated to a pressure of less than one micron and heated at a fast rate, i.e., 500° F./hr (270° C./hr) to 1200° F./hr (649° C./hr).

The furnace is then filled with a gaseous mixture consisting of 97% by weight nitrogen, 3% hydrogen, at a pressure of about 2.7 psig. The temperature of the furnace is then increased in steps to an ultimate nitriding temperature of 2000°–2600° F. (1093°–1427° C.) The temperature is held constant thereafter. Fresh nitrogen is intermittently supplied to the furnace to replace the nitrogen consumed in the forming of the silicon nitride. Any conventional nitriding sequence may be employed, such as depicted in U.S. Pat. No. 4,235,857 (Mangels), the disclosure of which is incorporated herein by reference.

The nitriding sequence is carried out for a period of about 72 hours, and in all cases no longer than 80 hours, which is more than half the normal time required for a nitriding sequence of silicon nitride which has been previously compacted. The use of a loose powder mixture during nitriding tends to control the normal exothermic reaction taking place between the silicon and nitrogen and calms such rapid exothermic reaction, preventing uncontrolled or localized melting of certain of the silicon particles. When the silicon particles are melted, they are unable to nitride properly and will result in defects that adversely affect certain physical properties in the hot pressed product. In addition, nitrogen diffusion, necessary to alpha silicon nitride, is inhibited because the melted particles are coalesced into a fluid bead which prevents the normal diffusion process from taking place.

The nitrided preformed plate will preferably have a density of 1.1–1.8 gm/cm$^3$ and have silicon nitride (at least 60% by weight of which is in the preferred alpha phase), along with 3-15% silicon yttrium oxynitrides.

2. Stacking

As shown in FIG. 1, a plurality of the preformed plates 21 are stacked in series within a hot pressing apparatus 10 with the smallest dimension 17 (thickness) of the preformed plates being aligned with the axis.49 of the pressing cavity defined by wall 14. The plates preferably are coated with a thin parting agent such as boron nitride or grafoil, neither of which acts as a rigid spacer. The number of plates can preferably be 10–12 in the stacking being without intervening spacers.

The apparatus is of a construction that has a graphite cylinder 11 defining the interior side wall 14 and graphite plungers 12 and 13, at least one of which is moved axially to provide a pressing force 2 3 . The preformed plates can have a density of 0.8-2.0 gm/cm$^3$, preferably 1.1-1.8 gm/cm$^3$ for the reaction bonded body of $Si_3N_4$, and a ratio of the smallest dimension 17 to the largest dimension 16 in the range of 1:3 to 1:40. The largest dimension must be less than the lateral dimension 18 (interior diameter) of the pressing cavity to leave an annular space 15 between the outer walls 20 of the billets and the interior wall 14 of the cylinder 11. The space preferably has a dimension of —1/64 inch along a radius 19 of the pressing cavity.

3. Filling Space

The annular space 15 is filled with a pseudo isostatic pressing medium preferably selected from the group consisting of boron nitride powder, flake graphite, a powder mixture of silicon nitride and boron nitride (about 50/50), ground borosilicate glass, and graphite foil. The isostatic media must have a compression ratio higher than that experienced by the preformed plates so as not to interfere with the densification process thereof. In this embodiment, three plys (about 0.008-0.010 inch in thickness) of graphite foil were wrapped around the outer diameter of the billets to occupy and fill the intended space 15. Other modes of placing the pseudo isostatic pressing medium in the space 15 may comprise casting, vibration, slurry coating, as well as other forms of implantation.

4. Hot Pressing

The stacked preformed plates, with the isostatic pressing medium in place, are then hot pressed to produce silicon nitride comprising billets of required dimension and density.

The heating and pressing is carried out preferably in increments:

(1) A mechanical loading of about 100 psi is applied at room temperature to the body and such loading may be increased up to 2000 or 3000 psi if desired to predensify the nitrided plates.

(2) The temperature is then increased to 1800° F. (982° C.) and the pressure increased to considerably higher levels.

(3) The temperature is then increased to 2500° F. (1371° C.) and the pressure is simultaneously increased to 2500 psi.

(4) The temperature is finally increased to the hot pressing temperature of 3000° F. (1649° C.) and the pressure increased to 3700 psi, the latter conditions being maintained until at least 99% or desirably 99.5% of theoretical full density is achieved. This usually requires 0.25-2.0 hours at the hot pressing temperature. The object is then cooled at any rate, even quenched, to room temperature. The resulting object will consist essentially of beta silicon nitride and 2.9-14.4% by weight silicon oxynitrides and a small amount of silicate glass, presumably an aluminum containing silicate.

5. Alternate Modes

The preferred mode may simply be varied by cold compacting the silicon metal mixture by use of compacting foces of above 1500 psi to form a low density preformed plate (density of about 1.4 gm/cm$^3$). The preforms are then processed as in the preferred mode by nitriding and hot pressing. The plates are coated with boron nitride as a separation means. The pseudo isostatic pressing medium is preferably selected to be a powder mixture of 50% silicon nitride and 50% boron nitride. The media is filled into the space 15. Again, no rigid spacers between plates or groups of plates is needed.

Figure 2:
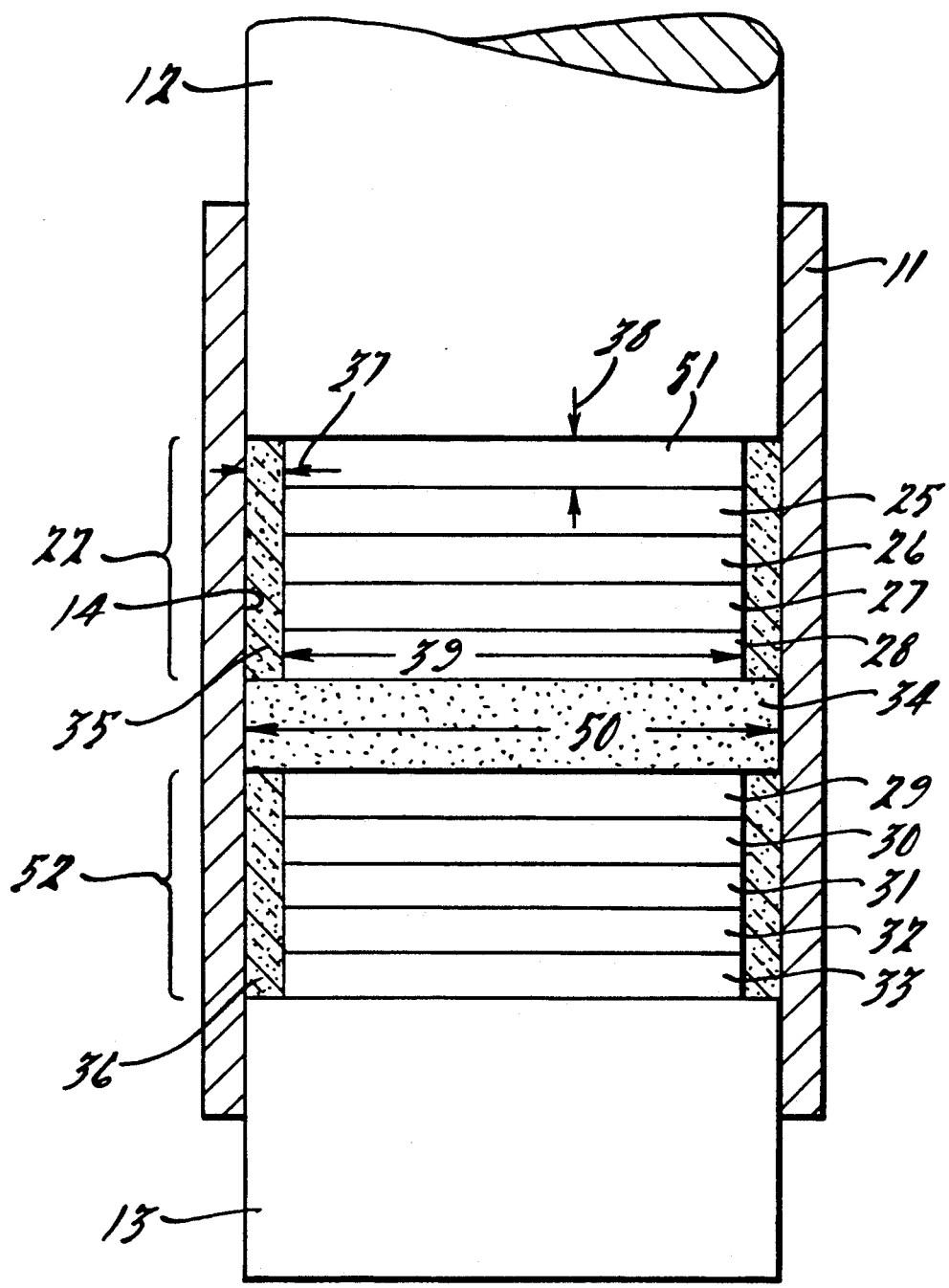
FIGS. 2 and 3 are views similar to FIG. 1 for hot pressing in accordance with alternative modes.

The preforms may also be made by mixing silicon nitride powder with densification aids, cold compacting or preheating the mixture into a plate having the required thickness (38) to width (39) ratio in the range of 1:3 to 1:40. If compacted, the pressure of about 1500 psi is employed to provide a density of 1.6-1.8 gm/cm$^3$ in such plates. If preheated, a temperature of about 2200°-4500° F. for about 4-40 hours in an inert atmosphere is utilized. As shown in FIG. 2, the billets may be stacked in-groups of five (group 22 having members 24-28 and group 23 having members 29-33), separated longitudinally by full size rigid graphite spacers 34 (having a diameter 50), and separated laterally from wall 14 by the annular spaces 35 and 36. The spaces have a radial dimension 37 of ⅛-1/16 inch and are filled with boron nitride powder. Both pistons 13 and 12 are moved to impart biaxial compression to the stacked billets while employing the heating sequence of the preferred embodiment, except that the temperature is raised to 1750° C.

Figure 3:
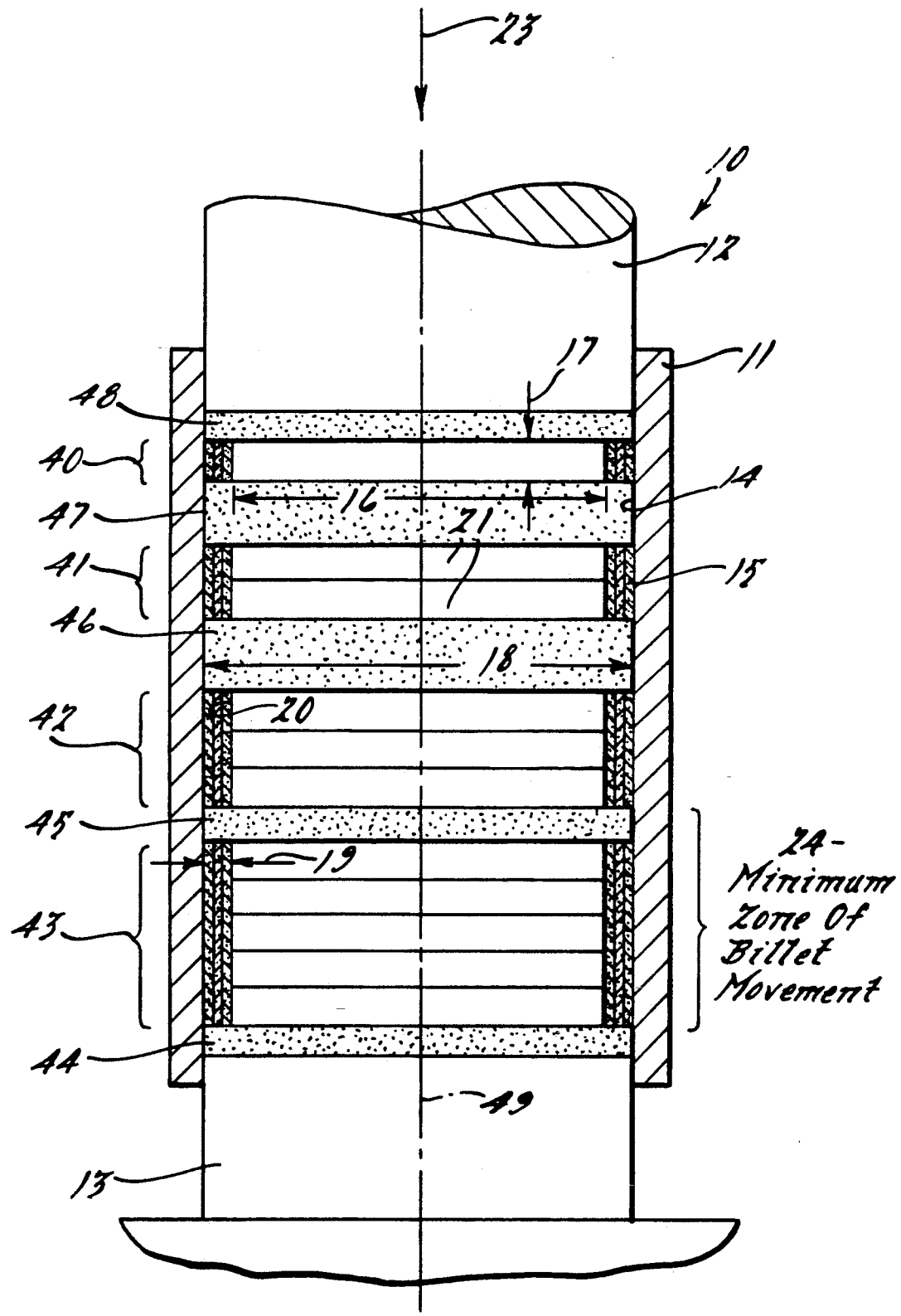

If more than 10 plates are desired to be hot pressed simultaneously, they should be arranged within the cavity in groups which decrease in numbers, the more remote they are from the minimum zone of movement 24. To illustrate (see FIG. 3), a group of plates 43 is placed on a rigid graphite member 44 and contains five billets; the group is in the zone of minimum movement. Group of plates 42 contains three billets, and groups 41 and 40, respectively, contain two and one billet, and are located more remote from the minimum zone of movement. These groups are separated by increasingly thicker rigid graphite spacers 45, 46 and 47. The spacers have a diameter effective to snuggly fit the interior of the cylindrical wall 50. The space 15 is filled by plys of graphite foil One of the great advantages of the inventive method is the ability to reuse the graphite hot pressing apparatus elements, uncontaminated by chemical reactions as a result of hot pressing. The apparatus has been used 20 times or more following this method without special reconditioning.

I claim:

1. A method of fully densifying a plurality of at least five preformed ceramic plates by axial compression of said plates along a wall defining a cylindrical cavity, comprising:

(a) stacking a series of said preformed ceramic plates with an intervening rigid inert spacer between groups of said plates, said plates being stacked along said wall with the smallest dimension of said plates being aligned with the axis of said cavity, each said plate having a ratio of the smallest dimension to largest dimension in the range of 1:3 to 1:40, said largest dimension being less than the lateral dimension of said cavity to leave an annular side space between said plates and wall, said annular space having a dimension of ⅛-1/64 inch along a radius of said cavity;

(b) either before or after introduction of said plates into said cavity, placing a pseudo isostatic pressing medium about said plates to fill said space when stacked in said cavity, said pressing medium being in a condition to have a compression ratio greater than that for said preformed plates to achieve equivalent densities; and (c) hot pressing said stacked series of preformed plates by said axial compression with said pressing medium filling said side space to resist only lateral movement of the plates, said hot pressing being carried out with sufficient temperature and pressure to convert said plates into billets with substantially full density.

2. The method as in claim 1, in which said pseudo isostatic pressing medium is selected from the group comprising boron nitride powder, flake graphite, a powder mixture of silicon nitride and multiple plys of boron nitride, ground borosilicate glass, and graphite foil.

3. The method as in claim 1, in which said pseudo isostatic pressing medium is placed about said plate by one of the following modes: casting, vibration, slurry coating, or implantation.

4. The method as in claim 1, in which the density of said plates in step (a) is in the range of 0.8–2.4 gm/cm$^3$.

5. The method as in claim 1, in which said groups of plates each number about five.

6. A method of fully densifying a plurality of reaction bonded silicon nitride preformed plates by axial compression of said billets along a wall defining a cylindrical cavity, comprising:
  (a) stacking a series of said preformed plates with an intervening rigid inert spacer between groups of said plates, said plates being stacked along said wall with the smallest dimension of said plates being aligned with the axis of said cavity, said plates having a density in the range of 2.0–2.4 gm/cm$^3$ and a ratio of the smallest dimension to the largest dimension in the range of 1:3 to 1:40, said largest dimension being less than the lateral dimension of said cavity to leave an annular side space between said plates and wall, said annular space having a dimension of $\frac{1}{8}$–1/64 inch along a radius of said cavity;
  (b) filling said annular space with a pseudo isostatic pressing medium comprised of generally equal amounts of silicon nitride and boron nitride powders, said pressing medium being in a condition to have a compression ratio greater than that for said preformed plates to achieve equivalent densities; and
  (c) hot pressing said stacked series of billets by said axial compression with said medium in said side space, said hot pressing being carried out with sufficient temperature and pressure to achieve substantially full density of said plates.

7. The method as in claim 6, in which said reaction bonded billets are prepared by heating an uncompacted quantity of a mixture of powdered silicon and a fluxing agent for aiding the hot pressing of said mixture, said heating being carried out in a suitable nitriding atmosphere without the use of pressure normally associated with hot pressing to fully react said mixture with said atmosphere to form a silicon nitride comprising plate, said mixture having a increased pore network to increase the inward migration efficiency of the atmosphere and having an increased surface area exposed to the atmosphere to decrease the nitriding diffusion distance.

8. The method as in claim 6, in which said pseudo isostatic pressing medium surrounds the sides of all said plates and acts as the sole pressure medium between said wall and plates while an axial mechanical pressing force is applied to the top and/or bottom of said stacked series of billets.

* * * * *